United States Patent [19]

Heeren

[11] 4,132,979
[45] Jan. 2, 1979

[54] METHOD AND APPARATUS FOR CONTROLLING A PROGRAMMABLE LOGIC ARRAY

[75] Inventor: Richard H. Heeren, Palatine, Ill.

[73] Assignee: Teletype Corporation, Skokie, Ill.

[21] Appl. No.: 750,934

[22] Filed: Dec. 15, 1976

[51] Int. Cl.² .................. H04L 15/34; H04Q 3/47; G06F 5/04; G05B 15/02
[52] U.S. Cl. .................. 340/147 P; 178/4; 178/30; 364/900
[58] Field of Search .................. 340/147 P, 173 SP; 235/151.22, 151.1, 151, 152, 92 LG; 318/568; 178/4, 30; 358/256, 280; 364/900

[56] References Cited

U.S. PATENT DOCUMENTS

| | | | |
|---|---|---|---|
| 3,823,397 | 7/1974 | Howard et al. | 178/23 R |
| 3,924,225 | 12/1975 | Langnickel | 178/30 |
| 3,987,286 | 10/1976 | Muehldorf | 235/152 |
| 4,020,465 | 4/1977 | Cochran et al. | 178/23 R |
| 4,031,519 | 6/1977 | Findley et al. | 178/30 |
| 4,037,089 | 7/1977 | Horninger | 235/152 |

OTHER PUBLICATIONS

GP Check et al., "Programmable Stepper Motor Control" IBM Technical Disclosure Bulletin, vol. 17, No. 11, pp. 3390–3391, Apr. 1975.

Primary Examiner—Donald J. Yusko
Attorney, Agent, or Firm—W. K. Serp; J. C. Albrecht

[57] ABSTRACT

A circuit is described for controlling a programmable logic array adapted for use with a communications terminal. The logic array includes an input AND-section defined by a plurality of addressable fields and an output OR-section. One field of the input section is addressed by an incoming address register selectively loaded with incoming data. A second field is addressed by a branch address register loaded with selective outputs of the output section thus providing program branching capabilities. Also, a loop counter and a clocked program counter address two additional fields of the input section. The loop counter facilitates program looping in the logic array while the program counter affords real time operational characteristics for the control circuit.

13 Claims, 2 Drawing Figures

METHOD AND APPARATUS FOR CONTROLLING A PROGRAMMABLE LOGIC ARRAY

BACKGROUND OF THE INVENTION

This invention generally relates to a method and apparatus for controlling the operation of a programmable logic array and, more specifically, relates to a control circuit particularly adapted for directing the operation of a communication terminal.

Communication terminals are widely used as devices for the reception and transmission of encoded data. Such terminals frequently include at least one information display in the form of a printer which provides the operator with a "hard copy" of the data received or sent. A type of "hard copy" printer finding increased application is the high speed matrix printer such as that described in U.S. Pat. No. 3,973,661 to DeBoo et al. entitled "Wire Matrix Printers and Electromagnetic Actuator Mechanisms Useful in Such Printers" issued Aug. 10, 1976. Such printers utilize a print head having a vertical array of print wires. Selected print wires, corresponding to a particular portion of a selected character, are actuated at each of the several head locations during the printing of a single character. The individual characters are printed as the print head is stepped across the copy during the printing of a text line. The selection of the print wires as well as the operation of the motors which position the print head across the paper and control the advance of the paper require relatively complex, sequentially timed control circuitry. One approach to such a control arrangement includes a microprocessor, several integrated circuits providing input-output and support functions, and a storage memory. The limited instructional set available with such microprocessors and their sequential command format generally necessitates their use with large and costly storage memories. Consequently, programming costs are high and should a change in the operation of the printer be required to accommodate a unique application, a substantial reprogramming effort is required. Further, the inherent time delays incurred while waiting for the motors to change direction, reach operating speeds and complete the desired operations usually require the use of separate timing devices in combination with the microprocessor.

The illustrated embodiment utilizes a programmable logic array (PLA) which features an unlimited instructional set thus providing high programming flexibility. Such an instructional set includes parallel in addition to sequential commands. The parallel command capability increases the effective speed of the control system and reduces the amount of memory capacity necessary to implement a selected program. Further, the number of support components, as compared to the microprocessor implementation of the same program, is considerably reduced. In practice, the entire control circuit of the illustrated embodiment may be incorporated into a portion of a single integrated circuit package. Additionally, program changes and modifications are easily incorporated without extensive and time consuming program revisions.

As previously mentioned, printer control usually requires the adherence to specified time delays on a real time basis to allow certain of the motors and other electromechanical devices in the printer to accomplish specified functions before subsequent operations may be performed. With reference to the illustrated embodiment, such timing delays are incorporated into the PLA control by the use of a clocked counter addressing one input field of the PLA thereby eliminating the necessity of providing separate peripheral timing components. As will subsequently be more fully appreciated, the real time operation of the illustrated embodiment uniquely accommodates the operational characterstic of a communications printer.

Thus, a control apparatus is described which is relatively easy to program and effectively controls the operation of a printer or other device with a minimum of operational instructions and corresponding low execution time.

SUMMARY OF THE INVENTION

The illustrated control circuit includes a programmable logic array with an input section having a plurality of addressable fields. An output section in cascade with the input section, is driven by the input section and provides a plurality of signal outputs. An improved address circuit for addressing the fields of the input section of the logic array includes means for addressing a first one of the addressable input fields in accordance with incoming data. A branch address register addresses a second one of said addressable fields of the output section of the logic array provided in response to a preceding input section address. A program counter sequentially addresses a third one of the addressable fields of the logic array input section and means are included for providing a clocking signal to the program counter for stepping the counter so that the address of the third addressable field charges at a rate determined by the clocking means. This feature facilitates the time sequencing of output signals at the output of the logic array.

Preferably, a loop counter is included for addressing a fourth field of the input section of the logic array. The loop counter has at least one control input which is fed by a selected output of the output section of the array.

In accordance with the illustrated embodiment, the incoming address means is in the form of a latch which is loaded with incoming data in response to an input signal from the signal clocking means. The branch address register is also in the form of a latch which is loaded with a branch address from selected outputs of the output section of the logic array in response to a load signal also from the logic array output section.

A method for controlling the operation of a programmable logic array is disclosed wherein the array defines an input section defining a plurality of addressable fields and an output section having a plurality of outputs. The step of addressing a first field of the input section with an address determined by an incoming data signal is described as well as addressing a second field of the input section with an address determined by a portion of the output section. Further, the step of addressing a third field of the input section with a programmed counter stepped by a continuous clocking signal is also illustrated. Additionally, the step of addressing a fourth field of the input section with an address determined by the output of a loop counter which is controlled by the output of the output logic section of the array is described.

It is a main object of this invention to provide an improved control circuit for controlling the operation of a programmable logic array which is particularly adapted for use in a communications terminal. Other objects and advantages of the invention will become obvious from the following description of a preferred embodiment thereof, when considered in conjunction with the accompanying drawings wherein:

DETAILED DESCRIPTION

Figure 1:
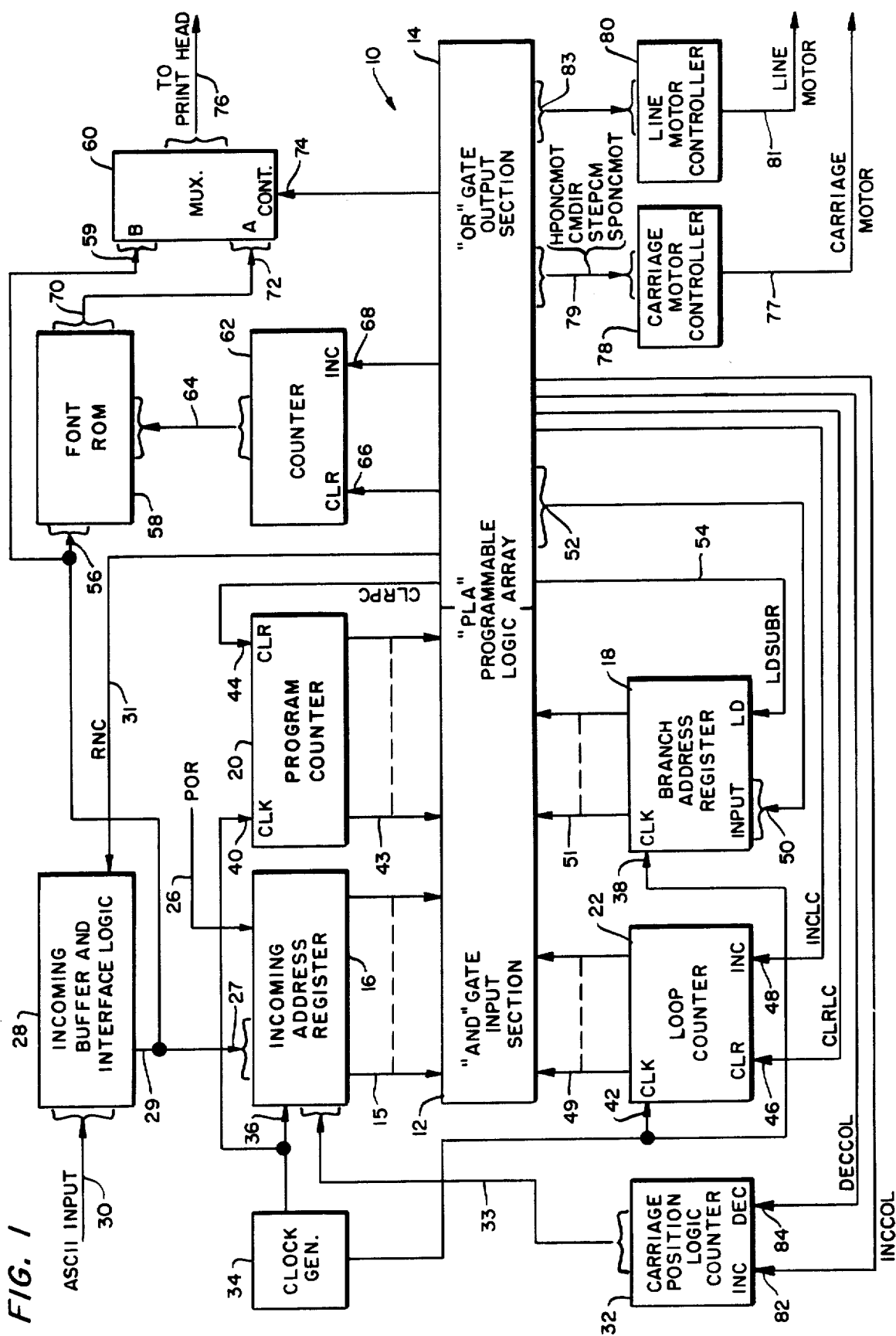
FIG. 1 is a schematic block diagram of a circuit for controlling a programmable logic array including certain features of this invention.

-Control Circuit FIG. 1-

The matrix printer control circuit illustrated in FIG. 1 includes a programmable logic array (PLA) 10 which is a read-only memory that is programmed to perform both sequential and combinational logic. Multilevel inputs to the PLA 10 serve to address an input section 12 in the form of an AND-gate array which in turn addresses a cascaded output section 14 in the form of an OR-gate array providing an output which is the value of the function stored in the array 10 for that particular input address. The PLA 10 may be viewed as a table look-up structure where the AND array forms the look-up library and the OR array forms the resultant output for the operation. The AND array input section 12 may be visualized as being partitioned into two or more fields. These fields are processed in parallel in the AND array to select words in the OR array output section 14. The OR array performs logic OR operations on the values written in the selected words of the AND array. Thus, by means of address inputs to select fields of the input section 12 of the PLA 10, selected AND-gate outputs are driven high thereby driving the respective OR-gate inputs high. The AND-gate and OR-gate sections may consist of suitably connected diodes or integrated circuit components.

The construction of such programmable logic arrays is well-known to those skilled in the art and the reader's attention is directed to three very thorough articles in "IBM Journal of Research and Development" Volume 19, No. 2, March 1975. One discussion is entitled "An Introduction to Array Logic" by Messrs. H. Fletcher and L. I. Maissel (pp. 98–109) another "Hardware Implementation of a Small Systems in Programmable Logic Arrays" by J. C. Logue et al. (pp. 110–119) and still another "Array Logic Macros" by J. W. Jones (pp. 120–126).

Figure 2:
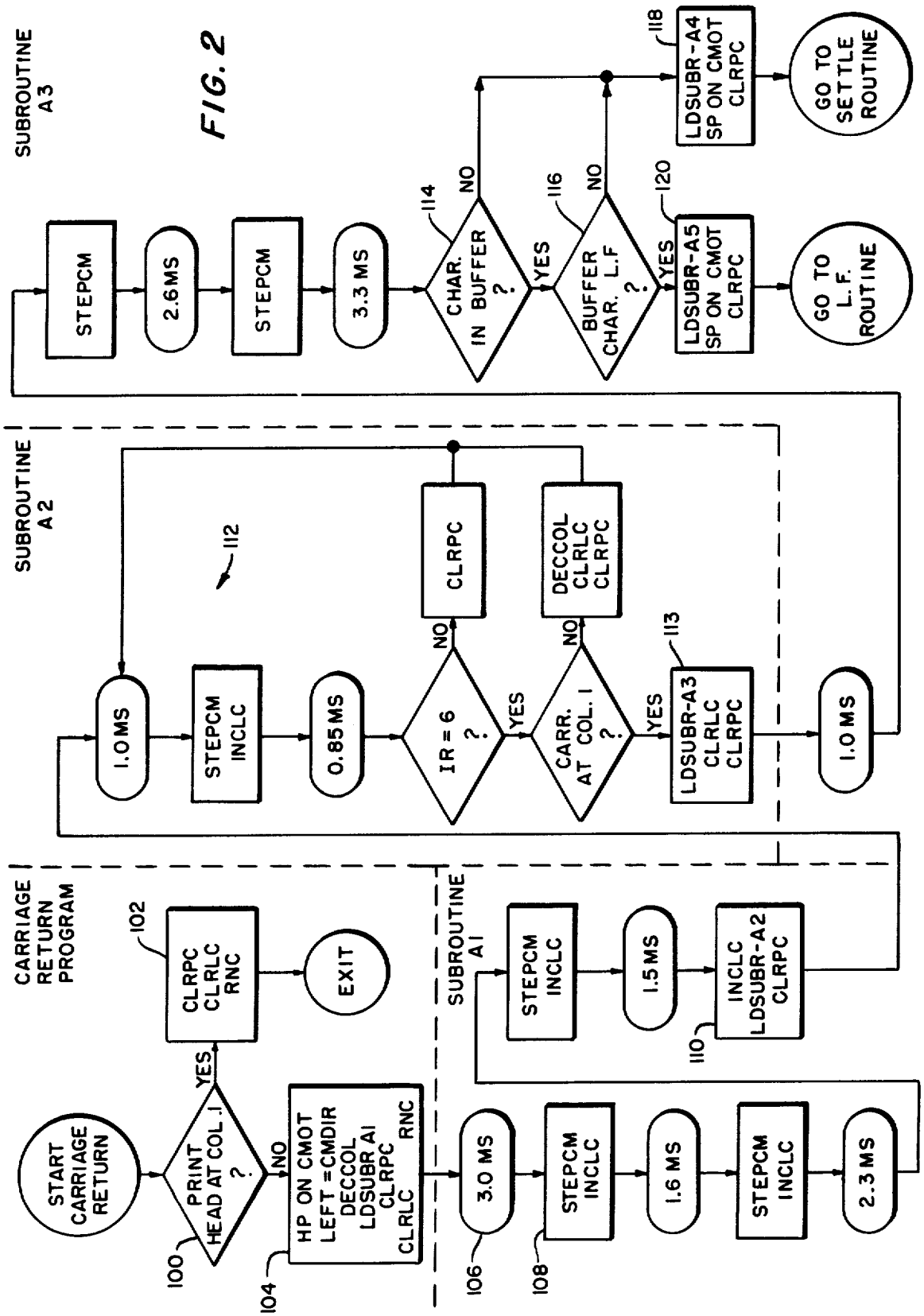
FIG. 2 is a flow diagram of an exemplary program which is particularly adapted for execution by the circuit illustrated in FIG. 1.

With reference to FIG. 1, as well as the exemplary logic flow diagram of FIG. 2, the following table is provided with the mnemonics illustrated in these figures listed adjacent their common description to aid the reader in understanding the subsequent discussion.

| Mnemonic | Common Description |
|---|---|
| CLRPC | Clear Program Counter |
| CLRLC | Clear Loop Counter |
| RNC | Request Next Character |
| HPonCMOT | High Power on Carriage Motor |
| CMDIR | Carriage Motor Direction |
| INCCOL | Increment Column Counter |
| DECCOL | Decrement Column Counter |
| LDSUBR | Load Subroutine Address |
| STEPCM | Step Carriage Motor |
| INCLC | Increment Loop Counter |
| SPonCMOT | Settle Power on Carriage Motor |
| POR | Power on Reset |

The AND-array input section 12 is defined by four input address fields. One field is addressed by outputs 15 of an incoming address register 16 in the form of a master-slave latch receiving incoming data. A second field is addressed by a branch address register 18 which is also in the form of a master-slave latch serving to retain selected outputs of the output section 14 of the PLA 10. Two additional field sections are included. The first section is addressed by program counter 20 stepped by a continuously running clock and the second is addressed by an index register or loop counter 22. The counter 22 is controlled by the output of the PLA 10 and provides a count representative of the number of times successive repetative operations have occurred or a program loop has been circulated. These four address fields of the input section 12 simultaneously address the cascaded output section 14 to select programmed output words.

As mentioned, the multilevel outputs 15 of the incoming address register 16 are parallel fed to the input section 12. One input level to the register 16 is provided by power on reset (POR) line 26 and a second group of inputs 27 are fed by the outputs 29 of an incoming buffer and interface logic unit 28. The incoming buffer and interface logic unit 28 receives its information via a line 30 from the multilevel ASCII output of the communications terminal (not shown) and is operationally directed by a receive next character (RNC) signal via line 31 from the output section 14. Additional multilevel inputs to the incoming address register 16 are provided by the outputs of a carriage position logic counter 32 via cable 33. The binary levels of the counter 32 indicate the line position of the print carriage as will hereinafter be further considered.

To synchronize the addressing of the PLA input section 12, the output of a clock pulse generator 34 is fed to a clock input 36 of the incoming address register 16, in the form of a latch, and to clock inputs 38, 40, and 42 of the branch address register 18, the program counter 20, and the loop counter 22, respectively. Selectively clearing the program counter is a clear program counter (CLRPC) signal fed from an output of the PLA 10 to a clear input 44 of the counter 20. The multilevel outputs 43 of the program counter serve to address the input section 12 of the PLA. As will be subsequently more fully appreciated, the level of the program counter is generally selected to accommodate the longest subroutine or time delay. The loop counter 22 includes a clear input 46 fed by a clear loop counter (CLRLC) signal from the output of the OR-section 14 of the PLA 10 and a control input in the form of an increment input 48 is similarly fed by an increment loop counter (INCLC) signal from the output section 14 of the PLA 10. The number of counter levels are selected to accommodate the maximum number of times a single portion of a routine is recirculated during execution of the selected program. The multilevel output 49 of the loop counter 22 addresses the input section 12 of the PLA 10. As previously mentioned, a feedback field of the input section 12 of the PLA 10 is addressed by output 51 of the branch address register 18 which is a master-slave latch and serves to select subroutines in the PLA 10. A multilevel input 50 of the branch address register 18 is fed from a multilevel output 52 of the output section 14 of the PLA 10. The PLA 10 output 52 is loaded into the slave portion of the register 18 by a load subroutine address (LDSUBR) signal via line 54 from the PLA 10 output section 14 and transferred to the output in response to a following clock signal at the input 38. Thus, in response to a LDSUBR signal the output of the PLA is retained in the branch register 18 and synchronously applied to the feedback field of input section 12 by a clock signal on the input 38.

The multilevel output of the incoming buffer and interface logic unit 28 is also fed to an input 56 of a font ROM 58 and into one input 59 of a two-to-one multiplexer 60. The font ROM 58 serves to decode the incoming ASCII characters from the buffer unit 28 and provides an output for control of the print head. The input to the font ROM 58 from the buffer unit 28, which is in the form of an incoming ASCII character, determines the character being printed and an alternate multilevel input to the font ROM 58 from a counter 62 via cable 64 determines which portion of that particular character is to be decoded for printing. The counter 62 has a modulus corresponding to the number of vertical columns in each character location. A clear input 66 and an increment 68 input of the counter 62 are actuated by suitable signals from the output section 14 of the PLA 10. A multilevel output 70 of the font ROM 58 is fed to a second input 72 of the multiplexer 60. Serving to control a switching input 74 of the multiplexer 60 is a control signal from the OR-gate section 14 of the PLA 10. In response to the control signal at input 74 either the multilevel output 70 from the font ROM 58 or the multilevel output of the incoming buffer and logic unit 28 will be fed the printer print head via a cable 76. The printing of conventional ASCII characters is accomplished when the input 72 of the multiplexer 60 is switched to the output 70 of the font ROM 58 and graphic display capabilities are provided in the alternate position of the multiplexer 60. A matrix print head suitable for control by the illustrated apparatus is described in U.S. Pat. No. 3,982,622 entitled "Actuator Mechanisms for Wire Matrix Printers" by J. A. Bellino et al. and in the aforecited U.S. Pat. No. 3,973,661.

Serving to control the position of the carriage motor (not shown) which advances the print head along a print line by signals via cable 77 is a carriage motor control unit 78 controlled by selected outputs CMDIR, STEPCM, HPonCMOT, and SPonCMOT fed via multilevel cable 79 from the output section 14 of the PLA 10. Similarly, a line or paper advance motor (not shown) is controlled by means of a motor control unit 80 via a line 81. The control unit is directed by multilevel outputs 83 of section 14 of the PLA 10. As previously mentioned, the binary output of the carriage position counter 32 is representative of the physical location of the print head carriage on the print line. The counter 32 is incremented by an increment column counter (INCCOL) signal at input 82 and decremented by a decrement column counter (DECCOL) signal at input 84 from the output section 14 of the PLA 10. The operation of the illustrated apparatus will be more fully appreciated after consideration of the following discussion of the exemplary program flow diagram illustrated in FIG. 2.

-EXEMPLARY PROGRAM FIG. 2-

The program illustrated in FIG. 2, having reference numerals at the hundreds level, serves to position the print head at the start of a print line in response to an incoming carriage return command. In response to such a carriage return command via line 30 (FIG. 1), a decisional operation 100 is executed to ascertain the position of the print head; namely, whether the print head is in the first column of the print line. As mentioned, the output of the carriage position counter 32 provides a count level corresponding to the physical position of the print head on the print line. An affirmative first column determination results in the generation of CLRPC, CLRLC and RNC signals 102 which reset the program counter 20, clear the loop counter 22 and request the next character from the incoming buffer 28. It should be noted that these commands as well as many subsequent program commands are executed in parallel. This feature is particularly desirable in that it greatly increases the effective operational speed of the controller. In the event the carriage is not at the first column position as indicated by the counter 32, the carriage motor is switched to high power (HP on CMOT) and the various signals indicated at operation 104 are executed including a LDSUBR A1 which loads subroutine A1 into the branch address register 18 from the PLA 10 output section 14.

Subroutine A1 steps the carriage while the carriage motor is reaching full operational speed. The first step in subroutine A1 is a 3 millisecond delay 106 provided by the program counter 20. It will be appreciated that the program counter 20 serves to implement such delays rather than utilizing external timing means as would generally be the case with microprocessor implementation of the same program. This feature, as previously mentioned, eliminates complicated timing circuitry which has generally been incorporated in prior control circuits. The level of the program counter is generally selected to accommodate the longest subroutine which generally commences and terminates with a CLRPC command. The next operation 108 of subroutine A1 involves the generation of STEPCM and INCLC signals which respectively direct the carriage motor controller 78 to step the carriage motor and correspondingly increment the loop counter 22. The remaining operations and various time delays in subroutine A1 are executed and upon completion of the subroutine the carriage motor has reached full operational speed and the print head has been moved across a portion of a character space. During the last operation 110 of subroutine A1, a LDSUBR A2 signal loads subroutine A2 from the output section 14 of the PLA 10 into the branch address register 18 for addressing the input section 12 via the address lines 51 on the next following clock pulse.

Subroutine A2 particularly illustrates the looping as well as branching characteristics of the apparatus of FIG. 1. During subroutine A2 the carriage motor controller 78 is directed to continuously step the carriage motor until it is determined that six motor steps have been executed as indicated by the level of the loop counter 22. This condition corresponds to movement of the carriage one character position and is effectively accomplished by the loop characteristics of the control circuit as implemented by the loop counter 22. Upon an affirmative determination that the loop counter is at binary level six, indicating that the carriage motor has been stepped six times corresponding to one character position, the level of the carriage position counter 32 is checked to determine if the print head is in the first column position. In response to a negative determination, the loop 112 is recentered and for each six STEPCM commands the counter 32 is decremented by a DECCOL signal. The loop 112 is exited when the counter 32 indicates that the print head of the printer is positioned at the first column of the line, that is, in the first character space on the print line. It will be appreciated that each time the loop 112 is recirculated the program counter is cleared and the loop counter (together with the program counter) provides indication of the instruction location within the program. Subroutine A2 illustrates the looping feature and reentry of the loop 112 by the apparatus of FIG. 1 wherein the loop counter 22 monitors recirculation of a selected portion of the program stored in the PLA without necessitating a change in the branch address register 18. After the level of the counter 32 indicates that the carriage motor has moved the print head to column 1, both the loop counter 22 and program counter 20 are cleared at operation 113 and subroutine A3 is loaded into the branch address register 18.

Subroutine A3 directs the carriage motor controller 78 to decelerate the print head carriage motor in preparation for the next program and again illustrates the decisional branching as well as real time operational characteristics of the apparatus of FIG. 1. During execution of subroutine A3, a status inquiry is made at 114, of the incoming address register 16 as to whether a character is present for printing. In the absence of such a character, subroutine A4 is loaded into the branch address register 18, the carriage motor controller 78 switches the carriage motor to settle power and the printer awaits the next incoming character. On the other hand, should a character be present, a check is made of the register 16 as at 116 to determine whether the incoming character is a line feed signal. If it is not a line feed, operation 118 directs subroutine A4 to be loaded into the branch address register 18 and the carriage motor power is reduced awaiting an incoming character. However, in the event an affirmative determination is made, operation 120 directs subroutine A5 to be loaded into the branch address register 18.

It will be appreciated that the unique PLA control circuit illustrated is quite effective in implementing relatively complex programs with a minimum of time and memory capacity. The various addressable input fields of the PLA 10 allow execution of branch routines as well as looping within the selected subroutine and operational real time delays.

Although this invention has been particularly shown and described with reference to a preferred embodiment thereof, it will be understood that various changes in form and detail may be made without departing from the spirit and scope of the invention as set forth in the following claims.

What is claimed:

1. A control circuit for a programmable logic array with an input logic section having a plurality of addressable fields and an output logic section in cascade with the input section and providing a plurality of signal outputs, an improved circuit for addressing the fields of the input section of the logic array comprising:
   means for addressing a first one of the addressable input fields in accordance with an incoming data signal,
   a branch address register addressing a second one of said addressable input section fields as determined by selected outputs of the output section of the logic array provided in response to a preceding input section address;
   a program counter for sequentially addressing a third one of said addressable fields of the logic array input section, and
   means for providing a clocking signal to said program counter for stepping said counter so that the address of said third addressable field changes at a rate determined by said clocking means while the output of said branch address register remains constant.

2. The control circuit of claim 1 which further includes a loop counter addressing a fourth field of the input section of the logic array, said loop counter having at least one control input which is fed by a selected output of the output section of the logic array whereby said control input serves to determine the address of the fourth field of the input section of the logic array.

3. The apparatus of claim 1 wherein said incoming address means is in the form of a latch which is loaded with an incoming data signal in response to a signal from said clocking means thereby synchronizing the operation of said incoming address means and said program counter.

4. The apparatus of claim 3 wherein said branch address register is in the form of a latch which is loaded with an address from selected outputs of the output section of the logic array in response to a load signal from said logic array output section the address being presented to the input section in response to a subsequent clock signal.

5. The apparatus of claim 4 which further includes a loop counter addressing a fourth field of the input section of the logic array, said loop counter having at least one control input which is controlled by a selected output of the output section of the logic array and serves to provide a count level representative of the number of repetitions of a selected portion of a program.

6. A control circuit for a communications terminal which includes a programmable logic array with an input logic section having a plurality of addressable fields and an output logic section in cascade with said input section and providing a plurality of signal level outputs, an improved address circuit for addressing the fields of the input section of the logic array comprising:
   means for addressing a first one of the addressable input fields in accordance with an incoming informational signal,
   a branch address register addressing a second one of said addressable input section fields as determined by selected outputs of the output section of the logic array provided in response to a preceding input section address, and
   a loop counter addressing a third field of the input section of the logic array, said loop counter having at least one control input which is fed by a selected output of the output section of the logic array and serves to provide a count level representative of the number of repetitions of a selected portion of a program.

7. The apparatus of claim 6 which further includes means for providing a clocking signal and a program counter addressing a fourth one of said input fields of said input section, said program counter being clocked by the output of said clocking signal means so that the address of said fourth addressable field charges at a rate determined by said clocking means while the output of said branch address register remains constant.

8. The apparatus of claim 7 wherein said branch address register is in the form of a latch loaded with an address from selected outputs of the output section of the logic array in response to a load signal from said logic array output section with the address being presented to the input section of the logic array in response to a subsequent clock signal.

9. The apparatus of claim 8 wherein said incoming address means is in the form of a latch which is loaded with data in response to a signal from said clocking means thereby synchronizing said incoming address means, said program counter and said branch address register with said clocking means.

10. The apparatus of claim 7 wherein said control input of said loop counter serves to enable incrementing of said loop counter in response to a signal from said clocking means.

11. A method for controlling the operation of a programmable logic array defining an input section including a plurality of addressable fields and an output section having a plurality of outputs in cascade with, and driven by the input section comprising the steps of:
  addressing a first field of said input section with an address determined by an incoming data signal,
  addressing a second field of said input section with an address determined by a portion of the output of said output section, and
  addressing a third field of said input section with a program counter successively stepped by a continuous clocking signal.

12. The method of claim 11 which further includes the step of:
  addressing a fourth field of said input section with an address presented by the output of a loop counter which controlled by a signal at the output section of the logic array whereby the level of the loop counter is representative of the number of circulations of a selected program loop.

13. A method for controlling the operation of a communications terminal including a programmable logic array with an input section having a plurality of addressable fields and an output section providing a plurality of selective outputs comprising the steps of:
  addressing a first field of said input section with an address determined by an incoming data signal,
  addressing a second field of said input section with an address determined by a prior output of said output section, and
  addressing a third field of said input section with an address representative of the number of times a selected program loop has been recycled as presented by the output of a loop counter controlled by the output of the output section of the logic array.

* * * * *